United States Patent
Blythe

(10) Patent No.: US 6,518,973 B1
(45) Date of Patent: Feb. 11, 2003

(54) METHOD, SYSTEM, AND COMPUTER PROGRAM PRODUCT FOR EFFICIENT BUFFER LEVEL MANAGEMENT OF MEMORY-BUFFERED GRAPHICS DATA

(75) Inventor: David Blythe, San Carlos, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/386,379

(22) Filed: Aug. 31, 1999

(51) Int. Cl.[7] ............................................. G06F 12/10
(52) U.S. Cl. ....................... 345/564; 711/203; 345/545
(58) Field of Search ................................ 345/564–568, 345/531, 501, 530, 545, 536; 711/200, 202, 203–208

(56) References Cited

U.S. PATENT DOCUMENTS 5,987,582 A * 11/1999 Devic .......................... 345/543
6,175,916 B1 * 1/2001 Ginsberg et al. ............ 711/203

* cited by examiner

Primary Examiner—Kee M. Tung
(74) Attorney, Agent, or Firm—Woodcock Washburn LLP

(57) ABSTRACT

A method, system, and computer program product is provided for managing the efficient transfer of graphics data to a graphics rendering system. A graphics application program writes graphics data to graphics buffers that are allocated in virtual memory. Each graphics buffer comprises a plurality of memory locations, followed by a sentinel page. While the application is writing graphics data to a graphics buffer, a sentinel page may be reached. If so, the operating system recognizes this condition as a graphics buffer page fault. In responding to this fault, the contents of the graphics buffer are transferred to the graphics rendering subsystem. In addition, the graphics data being output by the application is redirected to another graphics buffer.

15 Claims, 6 Drawing Sheets

METHOD, SYSTEM, AND COMPUTER PROGRAM PRODUCT FOR EFFICIENT BUFFER LEVEL MANAGEMENT OF MEMORY-BUFFERED GRAPHICS DATA

BACKGROUND OF THE INVENTION

1. Field of the Invention

The invention relates to computer graphics processing, and more particularly to the transfer of graphics data to a rendering subsystem.

2. Related Art

In a typical graphics system, graphics commands and data are created by a host processor in accordance with an application program. This information, known collectively hereinafter as graphics data, must then be transferred to graphics processing components which render an image based on the graphics data. A typical graphics system therefore comprises a host processor connected to a rendering subsystem. When transferring graphics data from a host processor to a rendering subsystem, some graphics systems use system memory as intermediate storage.

This is illustrated in FIG. 1. Graphics system 100 comprises a host processor 105. System memory 110 is connected to host 105. As host 105 creates graphics data 115 in accordance with an application program, graphics data 115 is sent to memory 110 for storage. Host processor 105 is also connected to geometry engine 112. Geometry engine 112 constitutes an initial processing module of the rendering subsystem. At appropriate intervals, host 105 will send a read command 120 to geometry engine 112. Read command 120 serves to instruct the geometry engine 112 to read graphics data 115 from memory 110. This effects the transfer of graphics data 115 from host 105 to geometry engine 112. Geometry engine 112 can then process graphics data 115 to produce output 125. Output 125 is then sent to subsequent modules in the rendering subsystem.

Memory 110 is illustrated in greater detail in FIG. 2. Memory 110 comprises a plurality of graphics buffers. Two of these graphics buffers are illustrated in FIG. 2, a graphics buffer 205 and a graphics buffer 210. Each comprises a series of memory locations. Graphics buffer 205 comprises memory locations 205A through 205n. Likewise, graphics buffer 210 comprises memory locations 210A through 210n. Each graphics buffer receives and stores graphics data from a host processor, pending subsequent access by a geometry engine.

Note that any graphics buffer has a finite size. Any attempt to write beyond the last location in a graphics buffer could result in the loss of graphics data. Hence, in current graphics systems that use buffering, an application that writes data to a graphics buffer must be aware of the size limitation of the graphics buffer. In particular, an application that writes data to a graphics buffer must repeatedly check on the amount of space remaining in a graphics buffer. If insufficient space is available in, say, graphics buffer 205, then the write operation must be redirected to a new buffer, such as graphics buffer 210.

This checking operation slows the transfer of graphics data from a host processor to a geometry engine. The transfer process is illustrated in FIG. 3. A transfer process 300 serves to transfer graphics data from a host processor to a geometry engine by way of graphics buffers in memory. Process 300 begins with a step 305. In a step 310, a value is obtained for the current pointer, representing the address of the next available memory location in a graphics buffer. This must be done before writing graphics data to the graphics buffer. In a step 315, the address of the last memory location in the graphics buffer is obtained. This is the graphics buffer end address. Knowing the graphics buffer end address allows the application to be aware of the location in the graphics buffer beyond which the application must not write. In a step 320 the application obtains the size of the graphics data block that will be produced by the pending graphics command. This value represents the amount of memory that will be required by the pending command.

In a step 325 the value of the current pointer is added to the size of the graphics data block that will be produced by the pending command. This sum is compared to the graphics buffer end address. If the sum is less than the graphics buffer end address, there is sufficient space remaining in the graphics buffer to hold the graphics data of the pending command. Processing would then proceed to step 330, in which the graphics data is written to the graphics buffer. In a step 335 the value of the current pointer is updated. The current pointer now indicates the position of the next available memory address in the graphics buffer. In a step 340 a query is made as to whether there is another command to be processed. If so, the process 300 returns to step 320. In step 320, the size of the memory requirement for the next command is obtained. If there is no additional command indicated in step 340, then the process concludes with a step 345.

If, in step 325, it is determined that there was insufficient memory remaining in the current graphics buffer to contain the graphics data from the pending command, then processing continues at a step 350. In step 350, the contents of the graphics buffer are sent to the rendering subsystem. To send the contents of a graphics buffer to the rendering subsystem, a read command is issued by the host processor to the geometry engine. The geometry engine then reads the buffered graphics data.

In a step 360 a new graphics buffer is allocated to store the graphics data from the pending command, since there was insufficient capacity in the original graphics buffer. In a step 365 the current pointer is reset to point to the first available address in the new graphics buffer. The process then returns to step 315. Here, the graphics buffer end address for the new graphics buffer is obtained.

Process 300, however, can be slow. For every graphics command that must be processed, step 325 must be performed. Therefore, for every command, the amount of memory needed must be compared to the amount of memory available. This requires an arithmetic check before each command can be processed. Moreover, there is a branch in the processing of each command, illustrated as step 325. If the logic of process 300 is implemented in software, step 325 represents a conditional branch instruction. Branching tends to be time consuming in modern computer architectures. Processors typically attempt to anticipate which branch will be chosen, and do a prefetch on the anticipated instructions. An incorrect guess by the processor means that the instructions in the anticipated branch must be discarded, and instructions from the other branch must be loaded. Hence, in light of the branching and arithmetic checking which must be performed for every graphics command, current graphics processing architectures that operate in the manner of process 300 tend to be time consuming.

What is needed, therefore, is a more efficient way to transfer graphics data from a host processor to a rendering subsystem in systems which use memory to buffer graphics data.

SUMMARY OF THE INVENTION

The invention provides a method, system, and computer program product for managing the efficient transfer of graphics data to a graphics rendering system. A graphics application program writes graphics data to graphics buffers that are allocated in virtual memory. Each graphics buffer comprises a plurality of memory locations, followed by a sentinel page. While the application is writing graphics data to a graphics buffer, a sentinel page at the end of the graphics buffer may be reached. If so, the operating system recognizes this condition as a graphics buffer page fault. In responding to this fault, the contents of the graphics buffer are transferred to the graphics rendering subsystem. In addition, the graphics data being output by the application is redirected to another graphics buffer.

Features and Advantages

The invention has the feature of incorporating a sentinel page in each graphics buffer. The invention has the additional feature of using the page fault handling process of a virtual memory operating system to facilitate efficient data transfer.

The invention has the advantage of allowing the application program to write graphics data to a graphics buffer without having to check on the availability of memory before each write operation. As a result, the invention has the further advantage of effecting rapid transfer of graphics data to a rendering subsystem.

Further features and advantages of the invention as well as the operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the accompanying figures. In the figures, like reference numbers indicate identical or functionally similar elements. Additionally, the left most digit of a reference number identifies the drawing in which the reference number first appears.

DETAILED DESCRIPTION OF THE PREFERRED EMBODIMENTS

Figure 1:
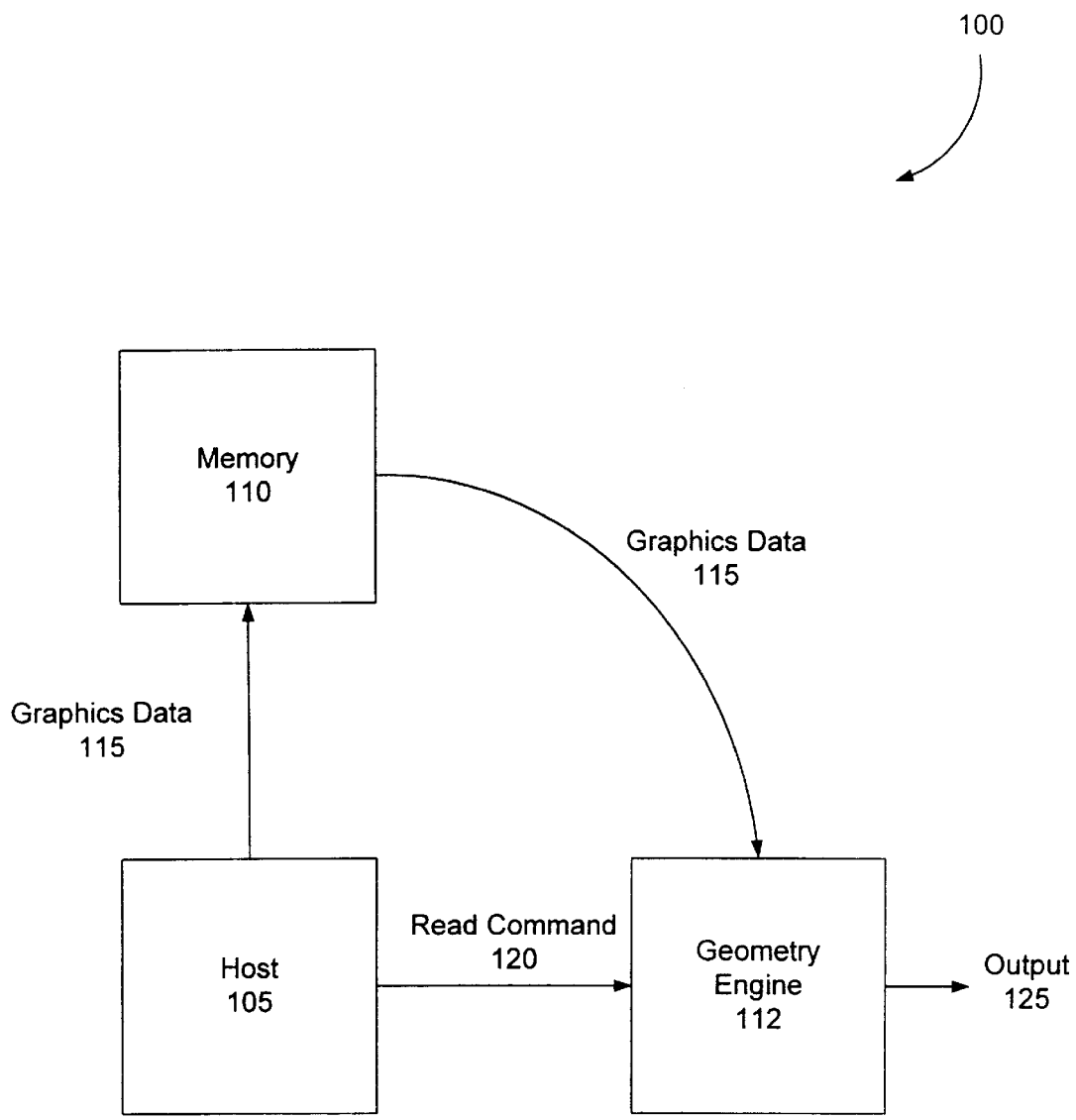
FIG. 1 is a block diagram illustrating the architecture of a computer graphics system.
Figure 2:
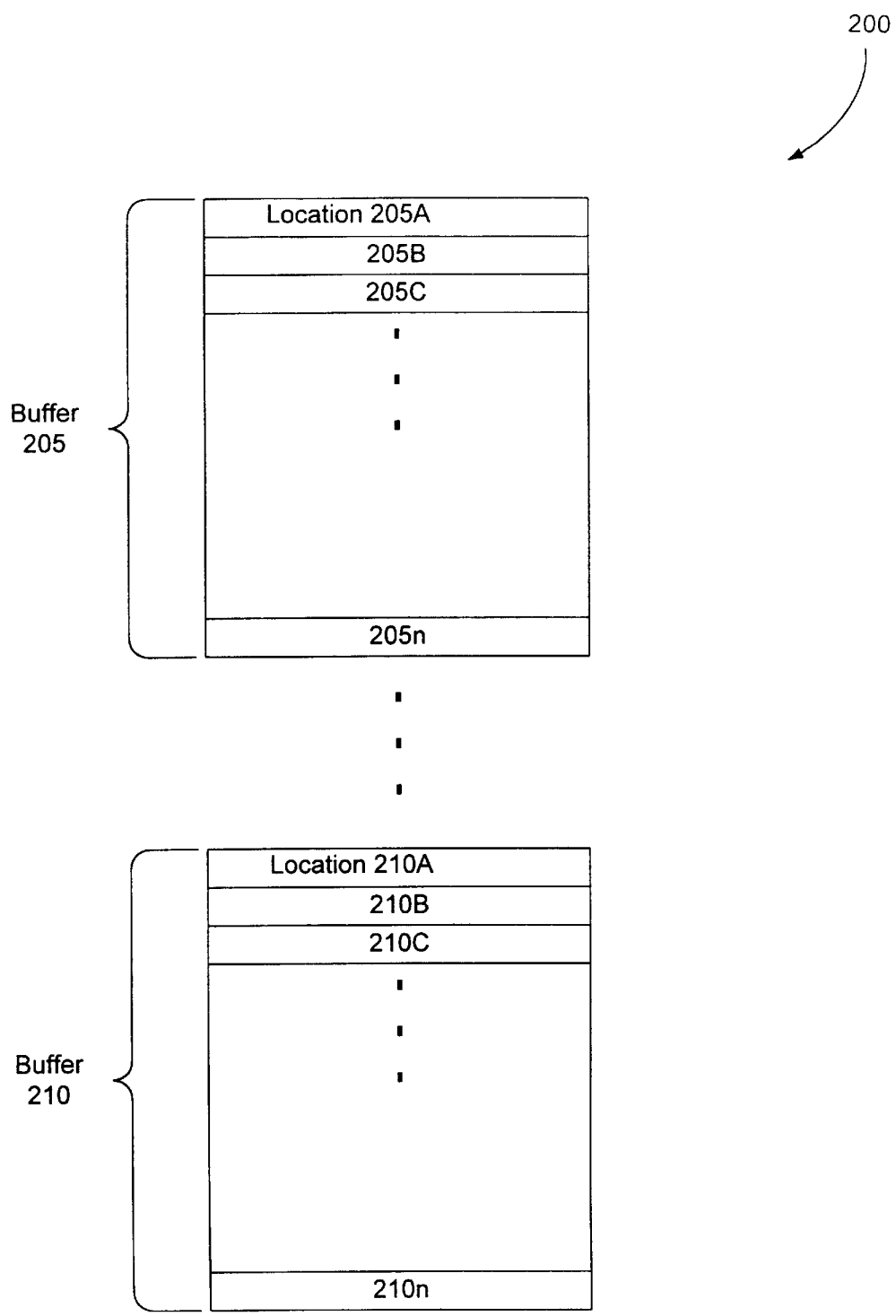
FIG. 2 illustrates the structure of graphics buffers in system memory.
Figure 3:
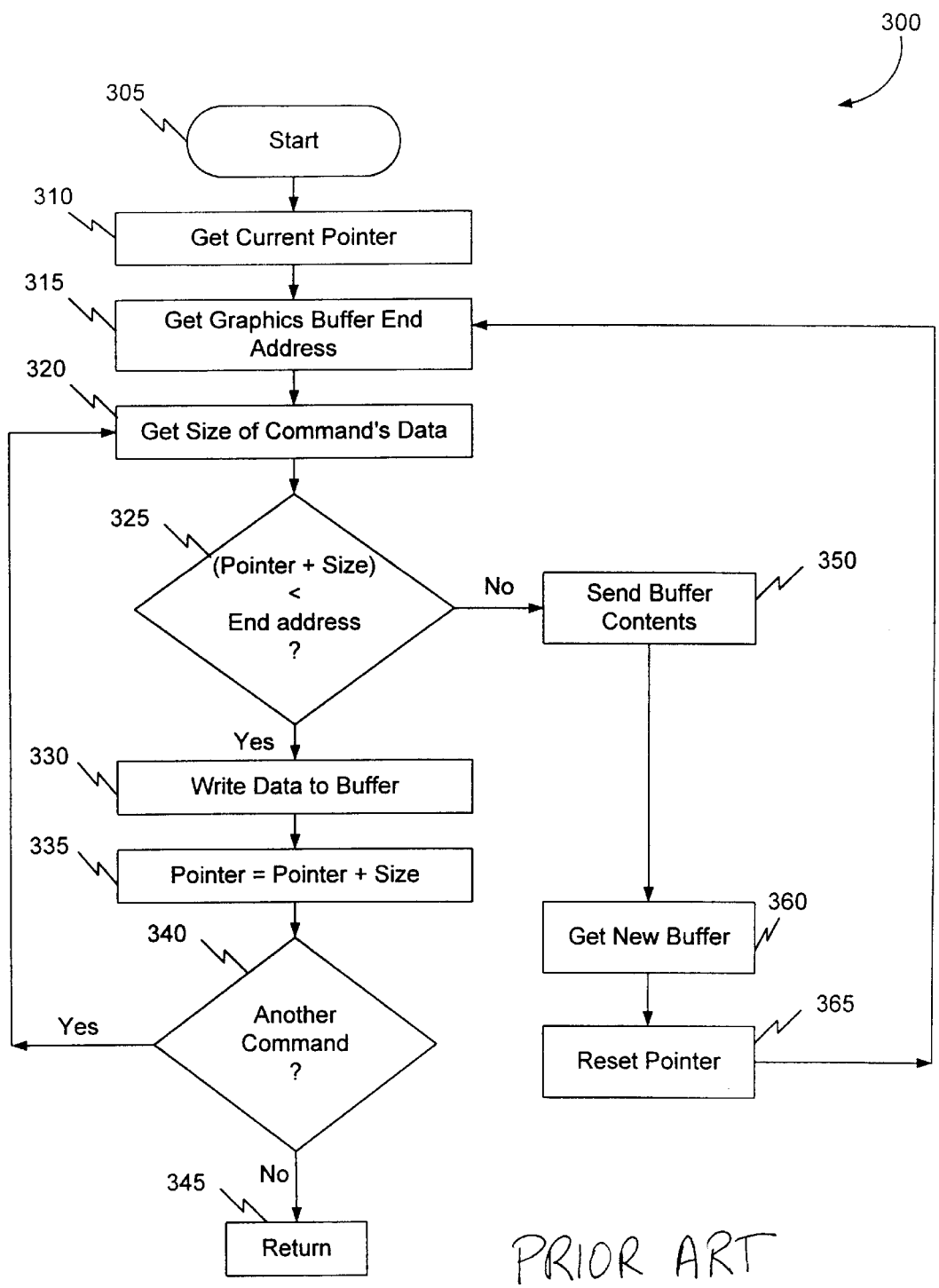
FIG. 3 is a flowchart illustrating the transfer of graphics data from a host processor to a geometry engine.

Contents
I. Overview
II. Terminology
III. Processing
IV. Environment
V. Conclusion

I. Overview

The invention provides a system and method for facilitating efficient transfer of graphics data from a host processor to a rendering subsystem. The invention takes advantage of page fault processing in a virtual memory operating system. The virtual memory comprises a plurality of graphics buffers. The graphics buffers each comprise a plurality of memory locations followed by a single sentinel page at the end of the graphics buffer. The host processor sends graphics data to a graphics buffer until the sentinel page is reached. Reaching the sentinel page initiates the transfer of the graphics data in the graphics buffer to the geometry engine. Moreover, the pointer used in writing graphics data to memory is reset to a new graphics buffer. The invention has the advantage of being faster than current graphics processing architectures that use buffered memory. Here, the host processor does not need to check the amount of available graphics buffer space before every command of the application program.

II. Terminology

The following section defines several terms that occur frequently throughout the application.

Graphics data is any type of data that defines an image, including but not limited to graphics commands and parameters.

Geometry engine refers to a hardware component that performs the first steps in a rendering process. These steps can include, but are not limited to, geometric calculations, lighting calculations, perspective operations, and color processing of pixels. The output of a geometry engine represents data that can be rasterized.

Pagefault refers to a fault condition in which a process attempts to access a system memory location beyond the block of memory allocated to the process.

Such a situation is typically detected by the operating system. The operating system may respond by denying the process access to the memory location and/or allocating a new block of memory to the process.

Virtual memory refers to a method by which an operating system manages a process' access to physical memory. A process is informed by the operating system that a block of memory has been made available to it. In reality, a block of physical memory smaller than this has been allocated to the process. The amount of memory available to the process, therefore, is not real, but virtual. This has the advantage of giving a process what appears to be a large block of memory, but takes advantage of the fact that the process will likely never need that much memory at one time. Virtual memory locations are mapped to physical memory locations via an operating system data structure called a memory table.

III. Processing

The invention described herein provides a system and method for facilitating efficient transfer of graphics data from a host processor to a graphics rendering subsystem. The invention uses an operating system that implements virtual memory. In particular, the invention takes advantage of the page fault processing of such an operating system. This enables the transfer of graphics data to a geometry engine via graphics buffers in virtual memory. The invention does not require a check on the amount of available memory in a graphics buffer before every command is processed.

Figure 4:
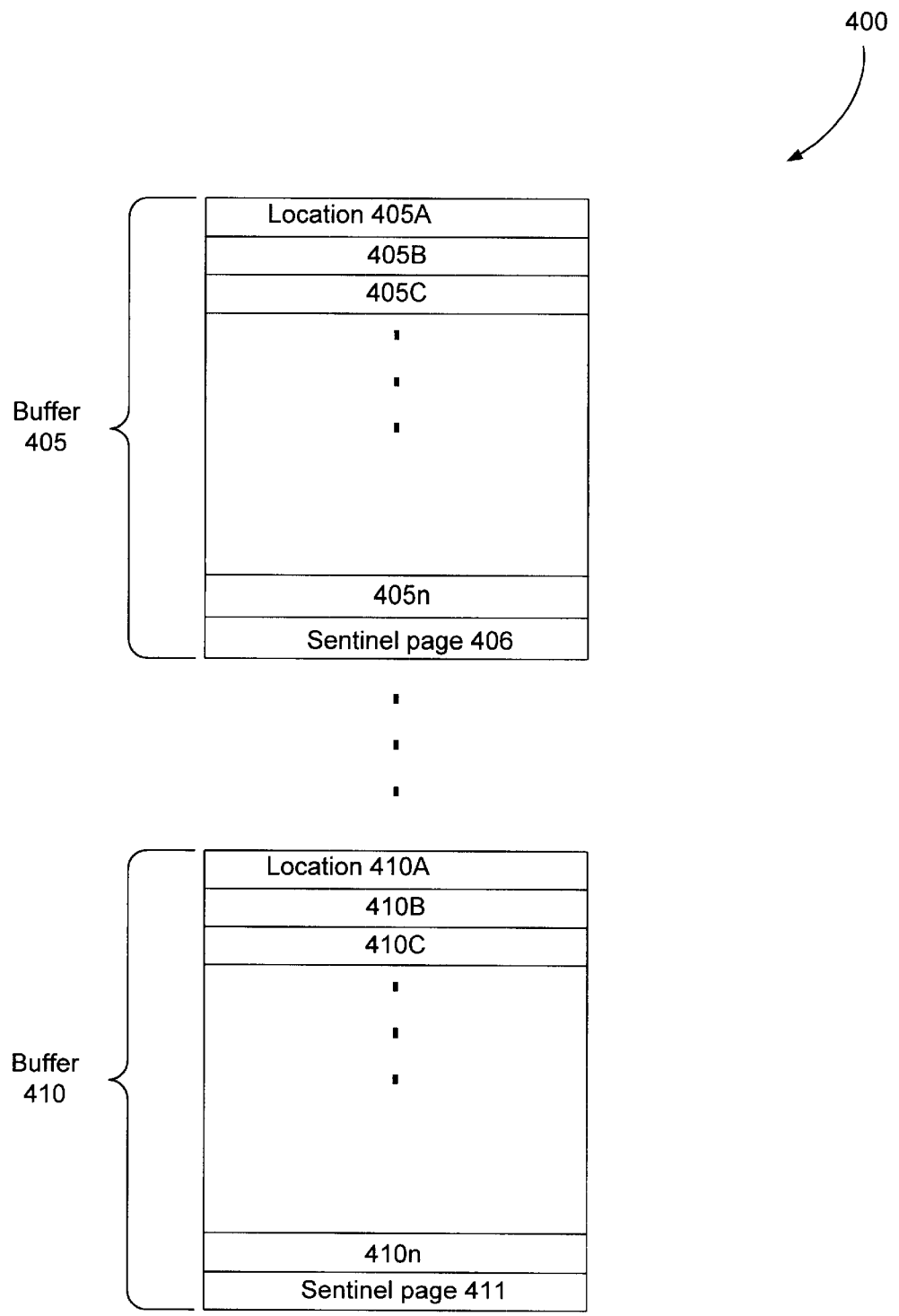
FIG. 4 illustrates the structure of graphics buffers in memory according to an embodiment of the invention.

The graphics buffer architecture of an embodiment of the invention is illustrated in FIG. 4. A graphics buffer 405 comprises a plurality of memory locations 405A through 405n. The last address of graphics buffer 405 is that of a sentinel page 406. As will be described below, a graphics application sequentially writes to each memory location in a graphics buffer 405 until reaching sentinel page 406. Reaching sentinel page 406 triggers a page fault; in particular, it triggers a graphics buffer page fault. As a result, the write process will be redirected to another graphics buffer. This second graphics buffer is illustrated in FIG. 4 as graphics buffer 410. Similar to graphics buffer 405, graphics buffer 410 comprises a plurality of memory locations 410A through 410n. Graphics buffer 410 also includes a sentinel page 411.

Figure 5:
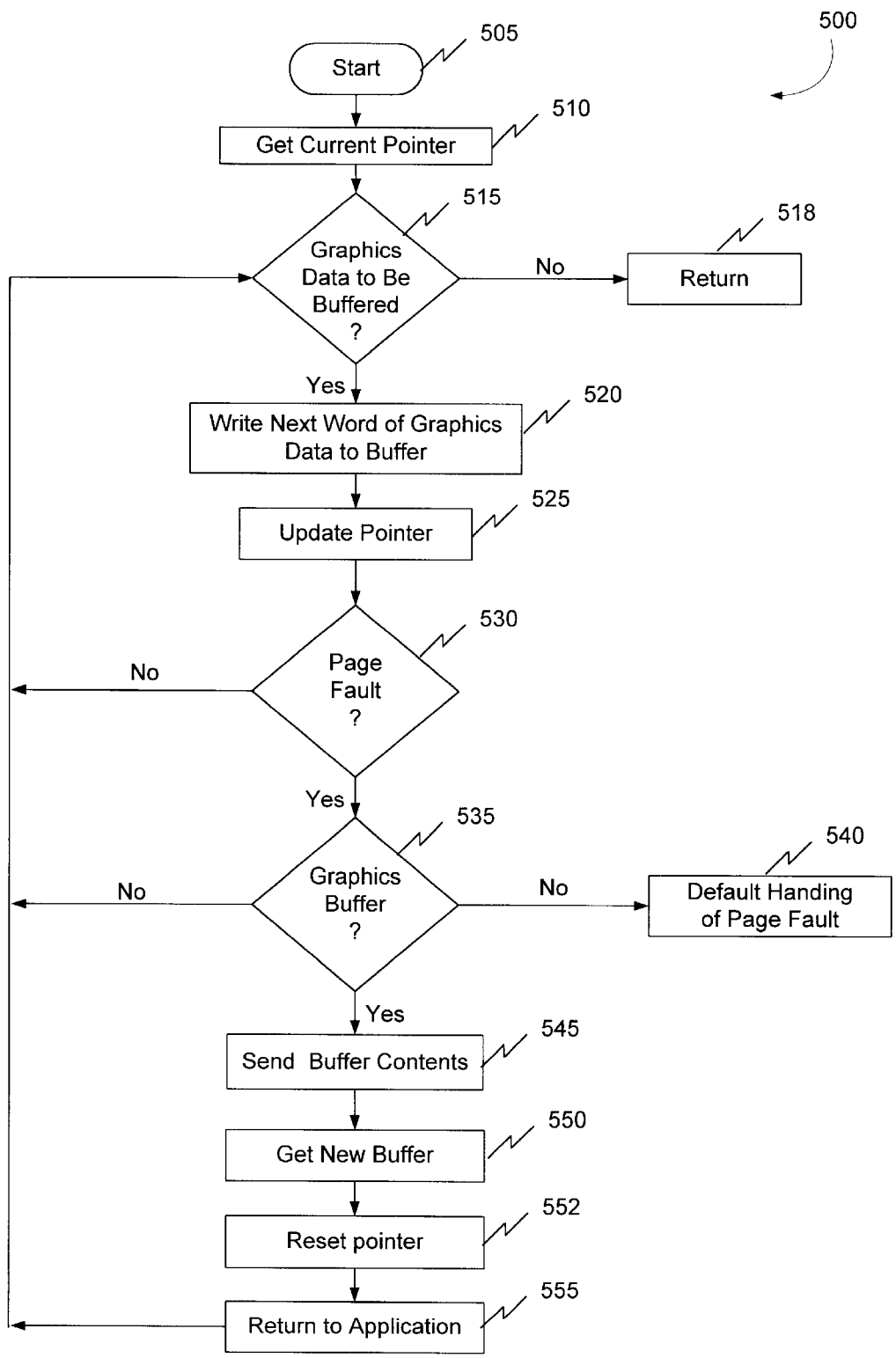
FIG. 5 is a flowchart illustrating the overall processing of an embodiment of the invention.

The process of an embodiment of the invention is illustrated in FIG. 5. Process 500 begins with a step 505. In a step 510 the first available memory address in a graphics buffer is obtained. This address is stored as the current pointer. If, in a step 515, there is graphics data (e.g., command data) to be buffered, then processing continues with a step 520. In step 520, the next word of graphics data is written by the host processor to the graphics buffer at the address indicated by the current pointer. In a step 525 the pointer is incremented so that it now points to the next memory location. In a step 530, a determination is made as to whether a page fault has occurred. This would be the case if the current pointer indicates the address of a memory location beyond the memory allocated to the application. If no page fault is indicated, then the process returns to step 515. In step 515 an inquiry is made as to whether there is additional graphics data to be buffered.

If a page fault is indicated in step 530, then in a step 535 the operating system determines whether the current pointer references a location in a graphics buffer. If not then the page fault is handled by the operating system as it would any other page fault. This takes place in a step 540.

If, in step 535, the current pointer indicates a memory address in a graphics buffer, then the operating system infers that not only has a page fault occurred, but a sentinel page in the graphics buffer has been reached. This condition constitutes a graphics buffer page fault. In response to the graphics buffer page fault, a step 545 is performed. In this step, the contents of the graphics buffer are transferred to the geometry engine. As described above, this is accomplished when the host processor instructs the geometry engine to read the contents of the current graphics buffer. The geometry engine will then read the graphics data from the graphics buffer. In an embodiment of the invention, the geometry engine reads the graphics data through a direct memory access (DMA) process. DMA is a memory access method well known to those skilled in the relevant art. In a step 550, a new graphics buffer is allocated to the application. In a step 552, the value of the current point is reset to indicate the first available memory location in the new graphics buffer. In a step 555 the application program is resumed. The process then returns to step 515. In step 515 an inquiry is made as to whether there is additional graphics data to be buffered. If so, processing continues as described above. If not, the process concludes with a step 518.

In a preferred embodiment of the invention, the operating system is programmed to detect graphics buffer page faults as follows. Any attempt by an application to access a virtual memory location is mediated by the memory table of the operating system. If a page fault occurs, either because a sentinel page has been reached or because of other reasons, the memory table will show that the desired memory location is not allocated to the application, or is an otherwise invalid physical memory location. Hence, the determination of step 530 is made by the operating system as a result of a memory table query. If the virtual memory address is also observed to correspond to a graphics buffer (as identified in the memory table in step 535), the operating system will infer that the address corresponds to a sentinel page.

Note that the operation of the invention includes the overhead of handling a graphics buffer page fault when a sentinel page has been reached. This reduces the throughput of the graphics data transfer from the host processor to the geometry engine. This overhead is incurred whenever a graphics buffer has been filled. The overall throughput of the system is therefore enhanced if the size of the graphics buffers is large. This makes graphics buffer page faults less frequent.

IV. Environment

Figure 6:
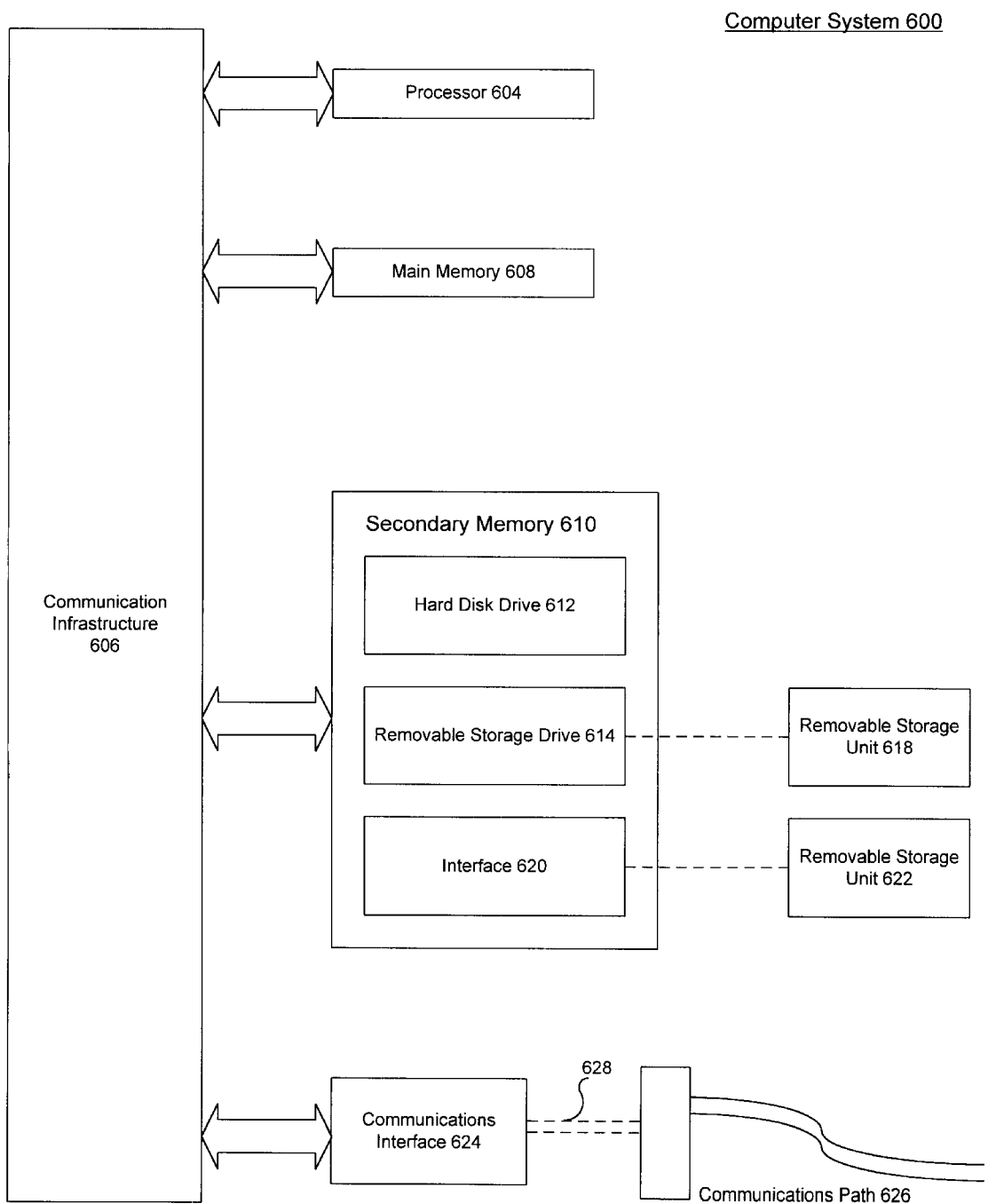
FIG. 6 is a block diagram illustrating the computing environment of an embodiment of the invention.

The invention operates in the context of an automated graphics processing system, illustrated generally in FIG. 1. A more detailed illustration of a processor 105 and its interfaces is shown in FIG. 6. Various software implementations of the invention can be described in terms of this example computer system. After reading this description, it will become apparent to a person skilled in the relevant art how to implement the invention using other computer systems and/or computer architectures.

A computer system 600 includes one or more processors, such as processor 105. Processor 105 is connected to a communication infrastructure 606 (e.g., a bus or network). Computer system 600 also includes memory 110, preferably random access memory (RAM). Transfer of data (such as graphics data 115) from processor 105 to memory 110 can be accomplished via communication infrastructure 606. Computer system 600 can also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software (such as a graphics application program or an operating system) and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 also includes at least one communications interface 624. Communications interface 624 allows software and data to be transferred between computer system 600 and external devices like geometry engine 112. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other media. Communications path 626 includes a path by which a read command 120 can be sent to a geometry engine. Communications path 626, taken together with communications infrastructure 606, also represent a path by which a geometry engine can access graphics data buffered in memory 110.

In this document, the terms "computer program medium" and "computer usable medium" are used to generally refer to media such as removable storage drive 614, a hard disk installed in hard disk drive 612, and signals 628. These computer program products are means for providing software (such as a graphics applications program or an operating system) to computer system 600.

Computer programs (also called computer control logic) are stored in main memory 110 and/or secondary memory 610. Computer programs may also be received via communications interface 624. Such computer programs, when executed, enable the computer system 600 to implement the present invention as discussed herein. In particular, the computer programs, when executed, enable the processor 105 to implement the present invention. Accordingly, such computer programs represent controllers of the computer system 600. Where the invention is implemented using software, the software may be stored in a computer program product and loaded into computer system 600 using removable storage drive 614, hard drive 612 or communications interface 624.

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of managing the transfer of graphics data to a rendering subsystem, comprising the steps of:
   (a) writing graphics data to a graphics buffer in virtual memory;
   (b) generating a graphics buffer page fault when a sentinel page is reached;
   (c) sending the contents of the graphics buffer to the rendering subsystem; and
   (d) accessing a new graphics buffer.

2. The method of claim 1, wherein step (a) comprises the steps of:
   (i) obtaining an address in virtual memory for the graphics buffer;
   (ii) writing graphics data to the address; and
   (iii) incrementing a pointer containing the address.

3. The method of claim 1 wherein step (b) comprises the steps of:
   (i) detecting that an address in virtual memory is invalid; and
   (ii) detecting that the address identifies a memory location within a graphics buffer.

4. The method of claim 1, wherein step (c) comprises the steps of:
   (i) commanding the rendering subsystem to read the graphics data from the graphics buffer; and
   (ii) performing direct memory access on the graphics data in the graphics buffer.

5. The method of claim 1, wherein step (d) comprises the step of obtaining an address in virtual memory for the new graphics buffer.

6. A system for managing the transfer of buffered graphics data to a graphics processing system, comprising:
   writing means for writing graphics data to a graphics buffer in virtual memory;
   graphics buffer page fault generating means for generating a graphics buffer page fault when a sentinel page is reached;
   sending means for sending the contents of the graphics buffer to the graphics processing system; and
   new graphics buffer accessing means for accessing a new graphics buffer.

7. The system of claim 6, wherein said graphics buffer page fault generating means comprises
   a memory table;
   invalid address detecting means for detecting that an address in virtual memory is invalid; and
   graphics buffer address detecting means for detecting that an address in virtual memory identifies a memory location within a graphics buffer.

8. A computer program product comprising a computer usable medium having computer readable program code means embodied in said medium for causing an application program to execute on a computer that generates a graphics buffer page fault when a sentinel page is reached while graphics data is being written to a graphics buffer, said computer readable program code means comprising:
   (a) first computer readable code means for causing the computer to detect that an address is invalid; and
   (b) second computer readable code means for causing the computer to detect that an address associated with a page fault identifies a memory location within a graphics buffer.

9. A computer program product according to claim 8, where said computer-readable program code means further comprises:
   third computer readable code means for writing graphics data to said graphics buffer in virtual memory.

10. The computer program product of claim 9, further comprising:
    fourth computer readable code means for sending the contents of said graphics buffer to a rendering subsystem.

11. A computer-readable medium comprising computer-executable modules having computer-executable instructions for managing the transfer of graphics data to a rendering subsystem, said modules comprising:
    a module for writing graphics data to a graphics buffer in virtual memory;
    a module for generating a graphics buffer page fault when a sentinel page is reached;
    a module for sending the contents of the graphics buffer to said rendering subsystem; and
    a module for accessing a new graphics buffer.

12. The computer-readable medium of claim 11, where said module for writing graphics data to a graphics buffer in virtual memory comprises:

a module for obtaining an address in virtual memory for the graphics buffer;

a module for writing graphics data to the address; and a module for incrementing a pointer containing the address.

13. The computer-readable medium of claim 11, where said module for generating a graphics buffer page fault when a sentinel page is reached comprises:

a module for detecting that an address in virtual memory is invalid; and a module for detecting that an address identifies a memory location within a graphics buffer.

14. The computer-readable medium of claim 11, where said module for sending the contents of the graphics buffer to the rendering subsystem comprises:

a module for commanding the rendering subsystem to read the graphics data from the graphics buffer; and a module for performing a direct memory access on the graphics data in the graphics buffer.

15. The computer-readable medium of claim 11, where said module for accessing a new graphics buffer comprises a module for obtaining an address in virtual memory for the new graphics buffer.

* * * * *